United States Patent [19]

Edelman

[11] Patent Number: 4,729,621
[45] Date of Patent: Mar. 8, 1988

[54] INTEGRAL OPTICAL FIBER COUPLER

[75] Inventor: William Edelman, Seal Beach, Calif.

[73] Assignee: Shiley Inc., Irvine, Calif.

[21] Appl. No.: 710,196

[22] Filed: Mar. 11, 1985

[51] Int. Cl.$^4$ .................... A61N 5/06; G02B 6/32
[52] U.S. Cl. .................... 350/96.15; 128/6;
350/96.10; 350/96.18; 350/96.26; 604/21;
604/53
[58] Field of Search ............. 350/96.10, 96.15, 96.24,
350/96.25, 96.26, 96.18; 128/303.1, 6; 604/20,
21, 53; 219/121 L, 121 LM, 121 LZ

[56] References Cited

U.S. PATENT DOCUMENTS

| | | | |
|---|---|---|---|
| 3,467,098 | 9/1969 | Ayres | 128/303.1 |
| 3,471,215 | 10/1969 | Snitzer | 350/96.26 |
| 4,011,403 | 3/1977 | Epstein et al. | 350/96.10 X |
| 4,207,874 | 6/1980 | Choy | 128/6 |
| 4,248,213 | 2/1981 | Landre | 128/6 |
| 4,266,548 | 5/1981 | Davi | 128/303.1 |
| 4,305,640 | 12/1981 | Cullis et al. | 350/96.10 |
| 4,398,790 | 8/1983 | Righini et al. | 350/96.10 X |
| 4,418,688 | 12/1983 | Loeb | 128/6 |
| 4,448,188 | 5/1984 | Loeb | 128/6 |
| 4,641,912 | 2/1987 | Goldenberg | 350/96.10 |
| 4,681,396 | 7/1987 | Jones | 350/96.18 |

FOREIGN PATENT DOCUMENTS

2095422  9/1982  United Kingdom ............ 350/96.10

OTHER PUBLICATIONS

Denise Grady, "The Artery Zapper" Dec. 1982, Discover, p. 36.

*Primary Examiner*—John Lee
*Attorney, Agent, or Firm*—Peter C. Richardson; Lawrence C. Akers; Mark Dryer

[57] ABSTRACT

A device for transferring high energy electromagnetic radiation from a laser to an optical fiber, which comprises a cone-shaped coupler having a wide proximal end and a narrow distal end, wherein the proximal end is in the form of a convex surface which acts as a focussing lens adapted to receive radiation from a laser and to transmit said radiation into and through said optical fiber and the distal end is attached to the input end of the optical fiber to form an integral assembly therewith, said cone-shaped coupler having a taper angle $\theta$ defined by the equation $$\theta = \sin^{-1}\left(\frac{N.A.}{\mu}\right),$$

wherein N.A. is the numerical aperture of the fiber material and $\mu$ is the refractive index of the material of the coupler at the wavelength of the incident radiation. A process for removing an obstruction by laser surgery using said device is also disclosed.

14 Claims, 2 Drawing Figures

INTEGRAL OPTICAL FIBER COUPLER

BACKGROUND OF THE INVENTION

This invention relates to a device for transferring high energy electromagnetic radiation from a laser source to an optical fiber, said device being in the form of an integral optical fiber coupler.

The device of the invention is particularly adapted to be used in apparatus for directing laser radiation on to targets such as vascular obstructions and atherosclerotic lesions.

The common disease atherosclerosis, which is a type of arteriosclerosis, is characterized by the formation of atherosclerotic lesions (also known as atherosclerotic plaques) on the inner wall of the aorta and the large and medium-sized arteries. The most important symptom in the early stages of this disease can lead to total blood vessel blockage, and ultimately, death of the patient. The atherosclerotic lesions are masses of fatty material associated with fibrous connective tissue, very often with secondary deposits of calcium salts and blood constituents. Human atherosclerotic lesions are characterized by a large lipid content, which may account for as much as 60 percent of the dry weight of some advanced lesions. Three major classes of lipids are found, i.e. cholesterol, cholesterol esters and phospholipids.

One technique currently practiced for correcting problems arising from arteriosclerotic lesions is coronary or peripheral arterial bypass surgery, in which a blood vessel segment removed from another part of the patient's body, e.g. a saphenous vein segment, or a synthetic vascular graft is implanted in parallel with the occluded artery. Although arterial bypass surgery has been practiced with great success for many years, it is a major surgical operation with inevitable attendant risks and the medical profession therefore has continued to search for techniques for reducing vascular obstructions such as arteriosclerotic lesions without bypass surgery.

Another technique currently practiced with considerable success in the treatment of arteriosclerosis is transluminal angioplasty, in which a balloon catheter is inserted into an affected blood vessel and the balloon then expanded outwardly against the occlusion to recannulate the vessel. One disadvantage of this technique is that it cannot be employed when the vessel is already fully blocked (or almost so) by occlusions. Also, it results principally in redistribution (i.e. compaction) rather than physical or chemical removal of the lesion material, most of which remains in the affected blood vessel wall and can serve as a site for future occlusive growth.

Recently it has been proposed to reduce vascular occlusions such as arteriosclerotic lesions by laser revascularization, in which electromagnetic radiation generated by a laser is carried by one or more optical fibers to the vicinity of the occlusion and directed at the occlusion. Uptake of the laser radiation by occlusion materials results in its conversion to relatively low molecular weight organic substances, which are dissolved in and carried away by the blood stream. Examples of apparatus for the practice of laser revascularization are disclosed in U.S. Pat. No. 4,207,874; U.S. Pat. No. 4,418,688; World Published patent application 8301893, published June 9, 1983; World Published application No. 8303188, published Sept. 29, 1983 and World Published patent application No. 8302885, published Sept. 1, 1983. A significant advantage of laser revascularization is that it can result in the essentially complete removal of a vascular occlusion (e.g. an arteriosclerotic lesion) in a surgical procedure that is far less invasive than bypass surgery. However, because of the difficulty in designing a laser catheter system whose use assures that the laser beam is carefully directed to impinge only upon the undesired occlusion, the practice of this technique involves a risk of damage to blood constituents and healthy surrounding tissues, particularly the surrounding non-arteriosclerotic blood vessel tissue.

Commonly assigned patent application Ser. No. 573,448 discloses a method for the reduction of an arteriosclerotic lesion without significant risk of damage to surrounding blood and healthy tissues involving the use of electromagnetic radiation in which substantially all of the electromagnetic radiation directed at the lesion is of a wavelength in the ultraviolet or visible region at which energy is selectively absorbed, as compared to absorption by whole blood and non-arteriosclerotic blood vessel tissue, by a lesion component present in said lesion at a greater weight percentage (on a dry basis) than in the whole blood or surrounding non-arteriosclerotic blood vessel tissue of the patient. The ensuing reaction and decomposition of said lesion component leads directly to the reduction of the lesion without significant risk to damage of the vicinal blood or, should the electromagnetic radiation be inadvertently misdirected, to the surounding healthy tissues. The electromagnetic radiation directed at the lesion is preferably monochromatic, i.e. substantially all within an extremely narow wavelength range. Preferably monochromatic electromagnetic radiation is generated by a laser and conducted to the vicinity of the lesion by at least one optical fiber. Monochromatic ultraviolet energy is preferably generated by an excimer laser.

Thus, cholesterol, which is a common component of arteriosclerotic lesions, selectively absorbs electromagnetic radiation having a wavelength of about 248 nanometers and treatment as described above with laser radiation of said wavelength leads to reduction of the lesion.

As used herein, the term "reducing an arteriosclerotic lesion", or the like, means substantially reducing the size of the lesion. Preferably, treatment is continued until essentially complete removal of the lesion has been achieved.

The use of electromagnetic radiation of a particular wavelength to selectively reduce or obliterate arteriosclerotic lesions does not depend upon the use of a particular delivery system but only upon the use of the type of radiation. However, without the use of a coupler system such as the one described herein the efficiency of the energy transfer from the laser to the optical fiber is greatly reduced.

It has now been found that the operation of a system using a laser source of electromagnetic radiation and directing said radiation to a target through one or more optical fibers is significantly improved and degradation of the optical fiber is reduced if the radiation from the laser to the optical fiber is conveyed through a coupling device, more particularly an integral optical fiber coupler.

SUMMARY OF THE INVENTION

In accordance with the present invention there is provided a device for transferring high energy electromagnetic radiation from an excimer laser to an optical fiber, which comprises a cone-shaped coupler having a wide proximal end and a narrow distal end, wherein the proximal end is in the form of a convex surface which acts as a focussing lens adapted to receive radiation from a laser and to transmit said radiation into and through said optical fiber and the distal end is attached to the input end of the optical fiber to form an integral assembly therewith, said cone-shaped coupler being made from a material having the same refractive index as that of the optical fiber and having a taper angle $\theta$ defined by the equation $$\theta = \sin^{-1}\left(\frac{N.A.}{\mu}\right),$$

wherein N.A. is the numerical aperture of the fiber material and $\mu$ is the refractive index of the material of the coupler at the wavelength of the incident radiation.

The device of the invention, although not restricted thereto, is particularly adapted for use in laser revascularization and, accordingly, the invention also provides a process for removing an obstruction by laser surgery which comprises subjecting the said obstruction to high energy electromagnetic radiation through an optical fiber which is coupled to an excimer laser by a cone-shaped coupler having a wide proximal end and a narrow distal end, wherein the proximal end is in the form of a convex surface which acts as a focussing lens adapted to receive said electromagnetic radiation and to transmit it into said optical fiber and the distal end is attached to the input end of the optical fiber to form an integral assembly therewith, said cone-shaped coupler being made from a material having the same refractive index as that of the optical fiber and having a taper angle $\theta$ defined by the equation $$\theta = \sin^{-1}\left(\frac{N.A.}{\mu}\right),$$

wherein N.A. is the numerical aperture of the fiber material and $\mu$ is the refractive index of the material of the coupler at the wavelength of the incident radiation.

Numerical aperture, N.A., is a basic characteristic of specific fibers. It may be considered as representing the size or "degree of openness" of the input acceptance cone as illustrated in FIG. 1 of the accompanying drawings described hereinafter. Mathematically, numerical aperture is defined as the sine of the half-angle, $\alpha$, of the acceptance cone.

The light-gathering power or flux-carrying capacity of an optical fiber is equal to the square of the numerical aperture, which is the ratio between the area of a unit sphere within the acceptance cone and the area of a hemisphere ($2\pi$ solid angle).

The maximum angle within which light is accepted into and conducted through an optical fiber may be calculated from Snell's Law:

$$\mu_A \sin\alpha_{max} = (\mu^2 - \mu_c^2)^{\frac{1}{2}}$$

wherein sin $\alpha_{max}$ is the numerical aperture, $\mu_A$ is the refractive index of air (1.00), $\mu$ is the refractive index of the fiber core and $\mu_c$ is the refractive index of the clad.

The above formulae for calculating the numerical aperture do not take into account striae, surface irregularities and diffraction, all of which tend to decollimate the beam. As described hereinafter, the device of the present invention eliminates deficiencies arising from surface irregularities in the fiber.

It is to be understood that although the preferred application of the device of the invention is in the art of laser surgery, and the invention will be particularly described herein with reference to such application, the device is also useful in any application where coupling between a laser source and a radiation applicator is necessary or desirable to concentrate or focus the electromagnetic radiation and/or to protect or preseve the applicator, e.g. optical fiber. A typical example of an alternative utility is in the art of high energy laser welding.

DESCRIPTION OF THE DRAWINGS

The invention will be particularly described with reference to a preferred embodiment as illustrated in the accompanying drawings, in which:

Referring to FIG. 1, this illustrates the acceptance cone 1 of radiation entering an optical fiber 2. The sine of the half angle defines the numerical aperture of the fiber.

Figure 1:
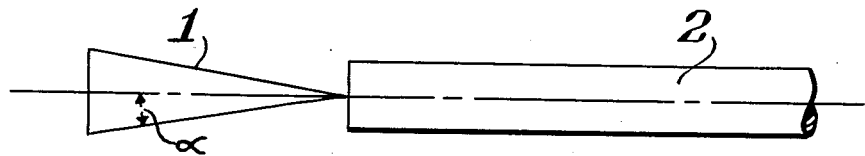
FIG. 1 illustrates schematically the acceptance cone of an optical fiber.
Figure 2:
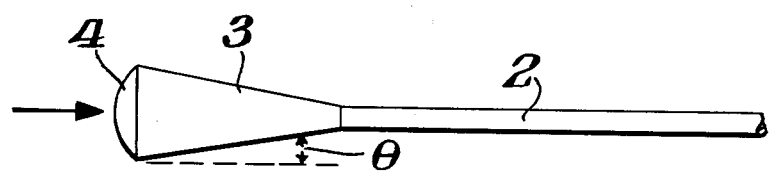
FIG. 2 is a schematic representation of a preferred embodiment of the invention.

The device illustrated schematically in FIG. 2 is a coupler 3 comprising a cone-shaped body having a convex proximal end forming a focussing lens 4. The cone-shaped coupler is attached at its distal end to an optical fiber 2 forming an integral assembly therewith.

The taper of the coupler is defined by taper angle $\theta$. The focusing lens bends the electromagnetic radiation passing through the coupler toward the input surface of the optical fiber. This allows a reduction of the radiation cross-section and, since the coupler is integral with the fiber, this concentration of energy does not cause breakdown in the material of the optical fiber.

DETAILED DESCRIPTION OF THE INVENTION

The device according to the invention which is essentially an integral optical fiber coupler, allows the transfer of high energy content electromagnetic radiation, particularly ultraviolet (UV) radiation, from a laser into an optical fiber. Preferably the integral assembly of optical fiber and coupler is formed of fused silica having a refractive index of from 1.43 to 1.47. With such material the taper angle is preferably about 9.79°.

Preferably the coupler device is adapted to operate with an excimer laser producing radiation having a wavelength of from 100 to 400 nm, more preferably about 248 nm.

In a particularly preferred embodiment the laser is a krypton fluoride excimer laser producing UV radiation having a wavelength of 248 nm.

The coupler device of the invention not only preserves the energy content of the laser impulse but also allows for the preservation of the fiber input surface. Since it is almost impossible to polish the surface of an optical fiber to eliminate imperfections having a thickness less than one laser wavelength, which in the case of said excimer laser is 0.2 micron, the coupling device of the invention, being integral with the fiber, acts as a physical extension of the fiber and thus allows energy transfer into the fiber without damaging any exposed surface thereof.

The formation of the coupler as an integral assembly with the optical fiber may be achieved in a number of ways and three preferred methods are provided by the invention.

The first preferred method for producing a device according to the invention comprises drawing out a solid rod of fused silica into a cone-shaped tapered body having a wide proximal end which is curved into a convex focussing lens and a narrow distal end which is of substantially the same diameter as an optical fiber to which it is to be attached and fusing said narrow distal end to the input end of said optical fiber to form an integral assembly therewith. Preferably the distal end of the tapered body is fused to the optical fiber by arc welding.

A second preferred method for producing a device according to the invention comprises forming the cone-shaped coupler as an integral extension of an optical fiber by forming the optical fiber in accordance with a conventional drawing process, slowing down the speed of draw to allow the diameter of the fiber to expand near the point at which the preform of fiber material is extruded and controlling the drawing speed and pressure applied to the preform so that the proximal end of the fiber becomes tapered into the desired cone-shaped configuration.

A third preferred method for producing a device according to the invention comprises machining a solid rod of fused silica into a tapered body having a wide proximal end and a narrow distal end, the diameter of said distal end being larger than the diameter of an optical fiber to which the tapered body is to be attached, subjecting the input end of said optical fiber to conventional heating and pressing techniques to form a small bulge thereon which is of comparable diameter to that of the distal end of the tapered body and then mating the surface of said bulge to said distal end to form an integral assembly of the tapered body and said optical fiber. Preferably the tapered body and optical fiber are mated by thermal fusion.

In the operation of the device according to the invention electromagnetic radiation, for example UV radiation having a wavelength of 248 nm, from a laser enters the coupler through an aperture which removes any aberration present in the initial laser beam. The radiation then passes into the coupler through the focussing lens forming the proximal end thereof and then, without any change of medium, into the input surface of the optical fiber.

If desired, the coupler may be inserted in a coupler holder. Thus, a metal sleeve may be used to align the coupler over its length with respect to the laser beam, so that the beam enters the coupler normal to the lens surface.

Typical dimensions for a preferred embodiment of the invention are as follows:

Core diameter of the optical fiber is from 200 to 600 microns.

The material of the coupler and optical fiber is fused silica having a refractive index of 1.43 to 1.47.

The taper angle is about 9.79°.

The numerical aperture of the fiber is from 0.1 to 0.5.

The length of the entire assembly is about 2 meters.

The above embodiment is adapted to operate with laser electromagnetic radiation having a wavelength from 100 nm to 400 nm. Particularly prefered is UV radiation having a wavelength of 248 nm from a krypton fluoride excimer laser.

The embodiment of the invention described above is particularly adapted for use in laser surgery. For such operation the optical fiber may be inserted directly into an artery or, alternatively, in order to observe the effect of the laser radiation on an atherosclerotic lesion, it is advantageous to open the artery longitudinally and to position the fiber perpendicularly over the target in order to photograph the laser action as it obliterates the atherosclerotic plaque. This type of procedure normally would be performed by a vascular surgeon or cardiovascular surgeon.

The fiber is also adapted to be inserted percutaneously into an artery for obliterating subtotal or occlusive atherosclerotic lesions.

I claim:

1. A device for transferring high energy electromagnetic radiation from an excimer laser to an optical fiber, which comprises a cone-shaped coupler having a wide proximal end and a narrow distal end, wherein the proximal end is in the form of a convex surface which acts as a focussing lens adapted to receive radiation from a laser and to transmit said radiation into and through said optical fiber and the distal end is attached to the input end of the optical fiber to form an integral assembly therewith, said cone-shaped coupler being made from a material having the same refractive index as that of the optical fiber and having a taper angle $\theta$ defined by the equation $$\theta = \sin^{-1}\left(\frac{N.A.}{\mu}\right),$$

wherein N.A. is the numerical aperture of the fiber material and $\mu$ is the refractive index of the material of the coupler at the wavelength of the incident radiation.

2. A device according to claim 1, in which the integral assembly of optical fiber and coupler is formed of fused silica having a refractive index of from 1.43 to 1.47.

3. A device according to claim 2, in which the taper angle is about 9.79°.

4. A device according to claim 1 which is adapted to operate with an excimer laser producing radiation having a wavelength from 100 to 400 nm.

5. A method for producing a device according to claim 1, which comprises drawing out a solid rod of fused silica into a cone-shaped tapered body having a wide proximal end which is curved into a convex focussing lens and a narrow distal end which is of substantially the same diameter as an optical fiber to which it is to be attached and fusing said narrow distal end to the input end of said optical fiber to form an integral assembly therewith.

6. A method according to claim 5, in which the distal end of the tapered body is fused to the optical fiber by arc welding.

7. A method for producing a device according to claim 1, in which the cone-shaped coupler is formed as an integral extension of an optical fiber by forming the optical fiber in accordance with a conventional drawing process, slowing down the speed of draw to allow the diameter of the fiber to expand near the point at which the preform of fiber material is extruded and controlling the drawing speed and pressure applied to the preform so that the proximal end of the fiber becomes tapered into the desired cone-shaped configuration.

8. A method for producing a device according to claim 1, which comprises machining a solid rod of fused silica into a tapered body having a wide proximal end and a narrow distal end, the diameter of said distal end being larger than the diameter of an optical fiber to which the tapered body is to be attched, subjecting the input end of said optical fiber to conventional heating and pressing techniques to form a small bulge thereon which is of comparable diameter to that of the distal end of the tapered body and then mating the surface of said bulge to said distal end to form an integral assembly of the tapered body and said optical fiber.

9. A method according to claim 8, in which the tapered body and optical fiber are mated by thermal fusion.

10. A process for removing an obstruction by laser surgery which comprises subjecting the said obstruction to high energy electromagnetic radiation through an optical fiber which is coupled to an excimer laser by a cone-shaped coupler having a wide proximal end and a narrow distal end, wherein the proximal end is in the form of a convex surface which acts as a focussing lens adapted to receive said electromagnetic radiation and to transmit it into said optical fiber to form an integral assembly input end of the optical fiber to form an integral assembly therewith, said cone-shaped coupler being made from a material having the same refractive index as that of the optical fiber and having a taper angle $\theta$ defined by the equation $$\theta = \sin^{-1}\left(\frac{N.A.}{\mu}\right),$$

wherein N.A. is the numerical aperture of the fiber material and $\mu$ is the refractive index of the material of the coupler at the wavelength of the incident radiation.

11. A process according to claim 10, in which the cone-shaped coupler and optical fiber are both made of fused silica having a refractive index of from 1.43 to 1.47.

12. A process according to claim 11, in which the taper angle $\theta$ is about 9.79°.

13. A process according to claim 10, in which said excimer laser produces radiation having a wavelength of from 100 to 400 nm.

14. A process according to claim 13, in which said laser is a krypton fluoride excimer laser producing UV radiation having a wavelength of 248 nm.

* * * * *